United States Patent
Nobileau

[11] Patent Number: 5,927,344
[45] Date of Patent: Jul. 27, 1999

[54] SUBSEA FLEXIBLE PIPE

[76] Inventor: Philippe Nobileau, 40 Chemin du Vinaigrier, 06 300 Nice, France

[21] Appl. No.: 08/582,461

[22] Filed: Jan. 3, 1996

[51] Int. Cl.$^6$ ........................................ F16L 9/18
[52] U.S. Cl. .................... 138/114; 138/115; 138/121; 138/131; 138/139; 138/143
[58] Field of Search ............................... 138/131, 121, 138/119, 139, 114, 115, 143

[56] References Cited

U.S. PATENT DOCUMENTS

| | | | |
|---|---|---|---|
| 267,326 | 11/1882 | Childs | 138/178 |
| 1,055,674 | 3/1913 | Smith | 138/178 |
| 1,499,050 | 6/1924 | Broome . | |
| 1,871,219 | 8/1932 | Lord . | |
| 1,977,175 | 10/1934 | Davis . | |
| 2,414,987 | 1/1947 | Tobey et al. . | |
| 2,445,485 | 7/1948 | Kopperman . | |
| 2,489,844 | 11/1949 | Zallea et al. . | |
| 2,582,249 | 1/1952 | Hendel . | |
| 2,713,503 | 7/1955 | Ekholm . | |
| 2,867,242 | 1/1959 | Harris et al. . | |
| 2,878,837 | 3/1959 | Burtt | 138/148 |
| 2,911,238 | 11/1959 | Myers et al. . | |
| 3,318,337 | 5/1967 | Bauer . | |
| 3,672,705 | 6/1972 | Rush . | |
| 3,730,229 | 5/1973 | D'Onofrio | 138/114 |
| 3,738,394 | 6/1973 | Westerbarkey . | |
| 3,822,412 | 7/1974 | Carlin et al. . | |
| 4,072,243 | 2/1978 | Conant et al. | 138/143 |
| 4,163,619 | 8/1979 | Fales | 138/121 |
| 4,344,462 | 8/1982 | Aubert et al. . | |
| 4,403,631 | 9/1983 | Abdullaev et al. . | |
| 4,423,283 | 12/1983 | Weismann . | |
| 4,592,231 | 6/1986 | Kant . | |
| 4,674,543 | 6/1987 | Ziemek et al. . | |
| 4,727,909 | 3/1988 | Griffiths . | |
| 4,830,059 | 5/1989 | Silberstang . | |
| 4,854,416 | 8/1989 | Lalikos et al. . | |
| 5,129,429 | 7/1992 | Winter et al. . | |
| 5,174,340 | 12/1992 | Peterson et al. . | |
| 5,390,494 | 2/1995 | Clegg . | |
| 5,456,291 | 10/1995 | Kunzmann . | |
| 5,603,358 | 2/1997 | Lepoutre | 138/121 |
| 5,619,878 | 4/1997 | Grosjean et al. . | |

FOREIGN PATENT DOCUMENTS

| | | |
|---|---|---|
| 25 54 911 | 6/1977 | Germany . |
| 778 555 | 7/1957 | United Kingdom . |
| 1 040 712 | 9/1966 | United Kingdom . |

Primary Examiner—Denise L. Ferensic
Assistant Examiner—James F. Hook
Attorney, Agent, or Firm—James E. Bradley

[57] ABSTRACT

A flexible pipe for subsea installation has a fluid impervious tube surrounded by a structure pipe. The structure pipe is a cylindrical monolithic member. It has at least two rows of slots extending along the length of the wall. The slots are evenly spaced apart, parallel and located on a helix. Each of the slots are in a row, which is also located on a helix, but extending in a different direction from the slot helix. Solid bands extend between the rows of slots. Arc members are located between each of the slots, the arc members joining the bands. The structure pipe surrounds a fluid impervious tube which is corrugated and metallic.

11 Claims, 3 Drawing Sheets

SUBSEA FLEXIBLE PIPE

BACKGROUND OF THE INVENTION

1. Field of the invention

This invention relates in general to flexible pipes for oil and gas well installations and in particular to those used for subsea oil and gas production.

2. Description of the Prior Art

In well production operations, flexible pipes are used for various purposes such as flowlines. A flexible pipe is herein considered to be a pipe having, at least during transportation and installation, sufficient flexibility along its longitudinal axis to accept a minimum radius of curvature around 6.5 times the diameter of the pipe. These flexible pipes must be able to withstand high internal pressures, as much as 5,000 psi. In underwater use for subsea well production, they must be able to withstand crushing due to external pressures as well as tensile loading during installation. In some installations, high temperatures are also encountered. In addition flexing should not affect the strength properties of the pipe.

Available flexible pipes rely on an inner polymeric tube to contain the high pressure fluid. While this works well enough at low temperature, high temperatures combined with pressure may make the polymers permeable to gas. This situation results in varying degrees of loss of transported fluid which accumulates between the inner and outer sheath which could cause the collapse of the inner sheath in case of rapid depressurization. Also this could cause accelerated corrosion of the reinforcing structure in case of hydrocarbon fluid containing corrosive agents such as H2S, CO2, etc. . . . In addition polymeric tubes are generally limited to temperatures less than 100 to 130 degrees C. depending of the nature of the polymer.

To withstand high temperature service, a metallic internal liner would be highly desirable. However, it has not been used because of the inherent rigidity of metal incompatible with the requirement of flexibility of a flexible pipe. Some attempts have been made to use a metallic liner with a corrugated wall. Since in these attempts, it was only considered to operate within the yield strength of the material the wall thickness had to be very thin leading to a wave height to wall thickness ratio of the corrugations exceeding 8. This high ratio causes very deep corrugations, which take up a large radial portion of the flexible pipe wall thickness. Also the resulting thin wall thickness limits the pressure capability and offers reduced service life in case of corrosive fluids.

Flexible pipes also have a reinforcing structure surrounding the fluid containing tube. Typical reinforcing structure includes a combination of at least two cross helical tensile armors wrapped around a helical winding of interlocking strips. While workable, this structure has many parts and is expensive to manufacture.

SUMMARY OF THE INVENTION

The flexible pipe of this invention has a monolithic metal structure pipe which surrounds the fluid containing tube. The structure pipe has at least two rows of slots extending along the length of the wall to provide flexibility. Each of the slots extends substantially in a circumferential direction over a fraction of 180 degrees. The space between the rows of slots defines at least two solid bands which extend along the length of the structure pipe and which are free of slots to provide tensile strength.

The row of slots and the band extend along helical lines. The arc members between the slots also are on a helix, but inclined in a different direction and at a much larger helical angle with regard to the axis of the flexible pipe. The slots are circumferentially spaced apart from each other and parallel. The solid bands linked by the arc members provide tension capability even without internal pressure.

The fluid containing tube is a metallic pipe having a corrugated wall with undulations. The apparent pitch, or the width of each undulation, is selected to allow the pipe to be bent on a radius that is around 6.5 times the diameter of the pipe with acceptable plastic strain according to the material used. The corrugated tube has an initial outer diameter less than the inner diameter of the structure pipe. For assembly, the corrugated tube slides easily into the structure pipe, due to the annular clearance given. During the manufacturing acceptance pressure test, the fluid pressure plastically deforms the corrugated tube outward into tight contact with the structure pipe.

DETAILED DESCRIPTION OF THE INVENTION

Figure 1:
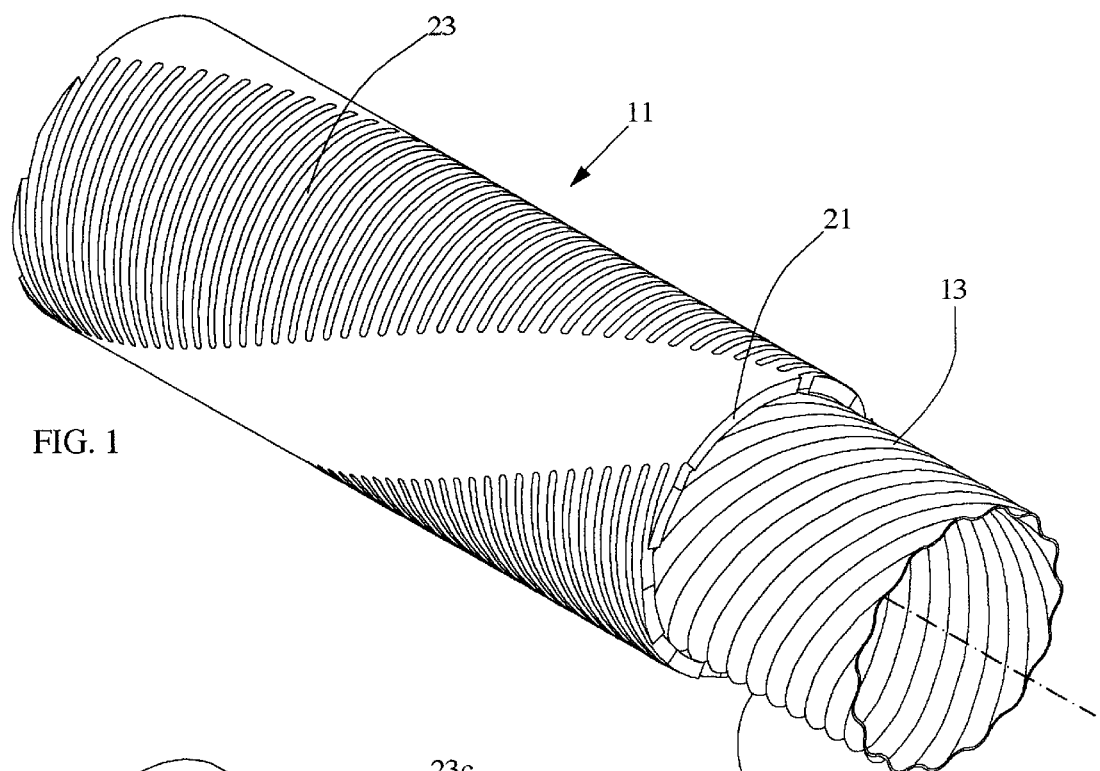
FIG. 1 is an isometric view illustrating a portion of a flexible pipe constructed in accordance with this invention.
Figure 4:
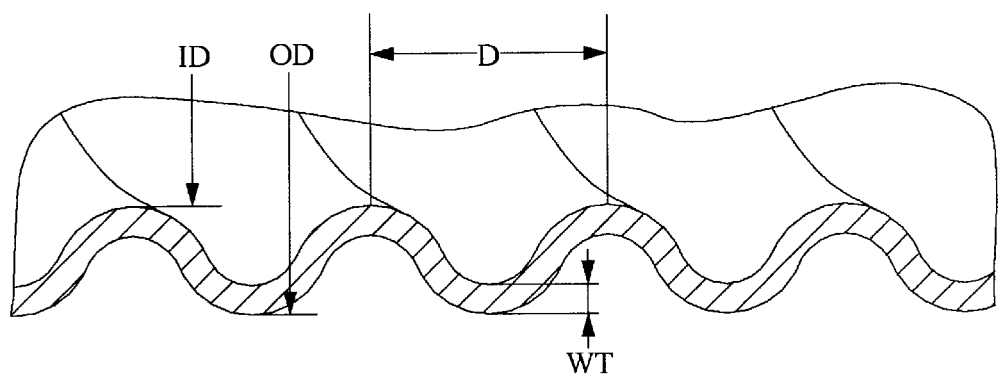
FIG. 4 is an enlarged sectional view of a portion of the corrugated tube of the flexible pipe of FIG. 1.
Figure 6:
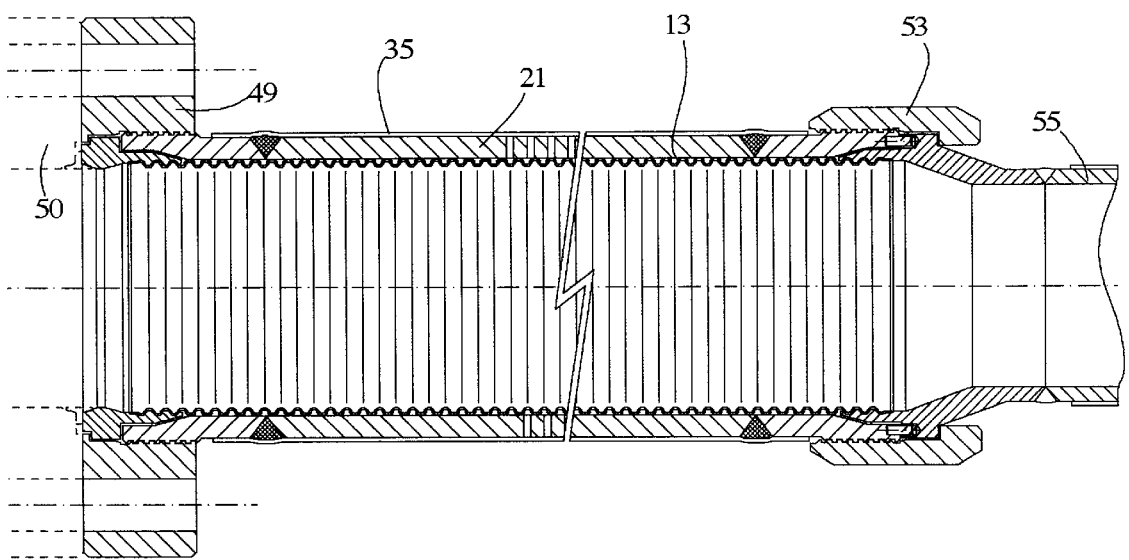
FIG. 6 is a sectional view of a flexible pipe jumper assembly constructed in accordance with this invention.

Referring to FIG. 1, flexible pipe 11 has a fluid containing tube 13 which is a solid metal cylinder, impermeable to fluid and having a corrugated wall with undulations 15. Undulations 15 can be perpendicular to the liner axis as shown in FIG. 6 or helicoidal as shown in FIG. 1. Undulations 15, referring to FIG. 4, have a selected apparent pitch D, wall thickness WT for each liner diameter to allow flexibility during installation, yet be able to withstand up to 5,000 psi internal service pressure. The table below gives the desired dimensions for a suitable corrugated tube in millimeters for 316L stainless steel, with ID and OD referring to inner and outer diameters with a crest to crest distance D of 16 mm.

| ID | OD | WT |
|-----|-----|-----|
| 104 | 117 | 1 |
| 173 | 186 | 1.5 |
| 216 | 231 | 2 |
| 266 | 282 | 2.5 |
| 310 | 326 | 3 |

Figure 2:
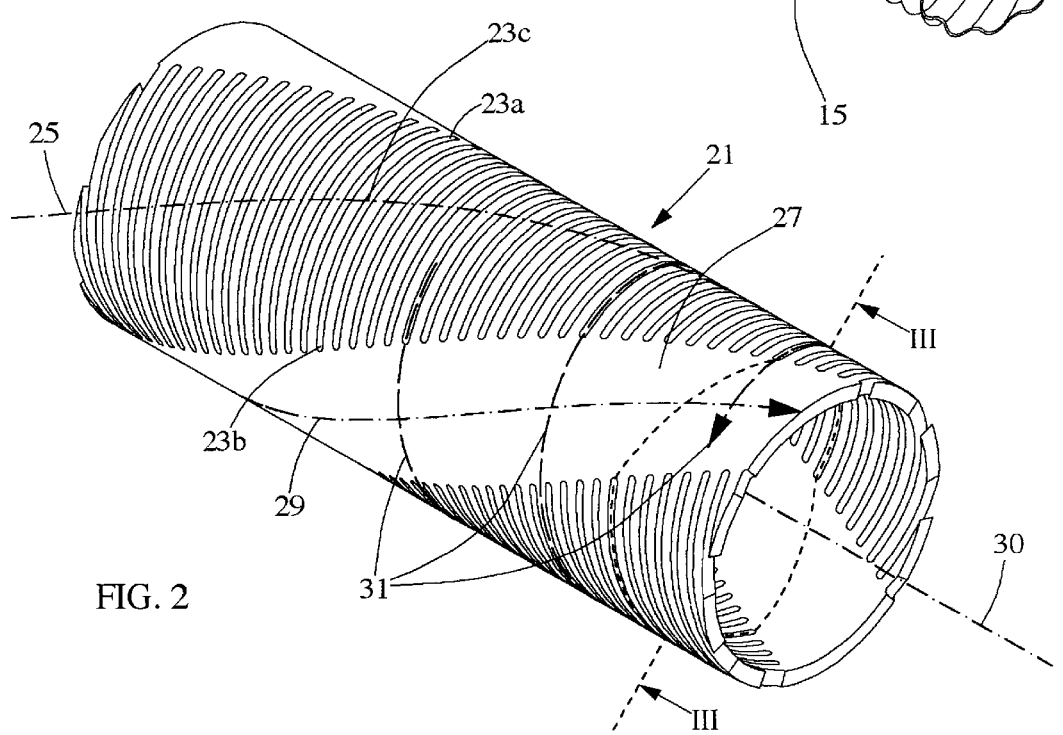
FIG. 2 is an isometric view illustrating the structure pipe for the flexible pipe of FIG. 1.

Note that the wave height, which is the difference between the ID and OD is less than to seven times the wall thickness WT. A structure pipe 21 surrounds the corrugated tube 13. Structure pipe 21, shown in FIG. 2, is a monolithic or single piece metal pipe. Structure pipe 21 is cylindrical and has rows of parallel slots 23. In the embodiment shown, there are two rows of slots 23, spaced opposite each other. Each slot 23 has a circumferential length defined by a first end 23a and an opposite end 23b. This length is substantially less than 180 degrees.

Figure 3:
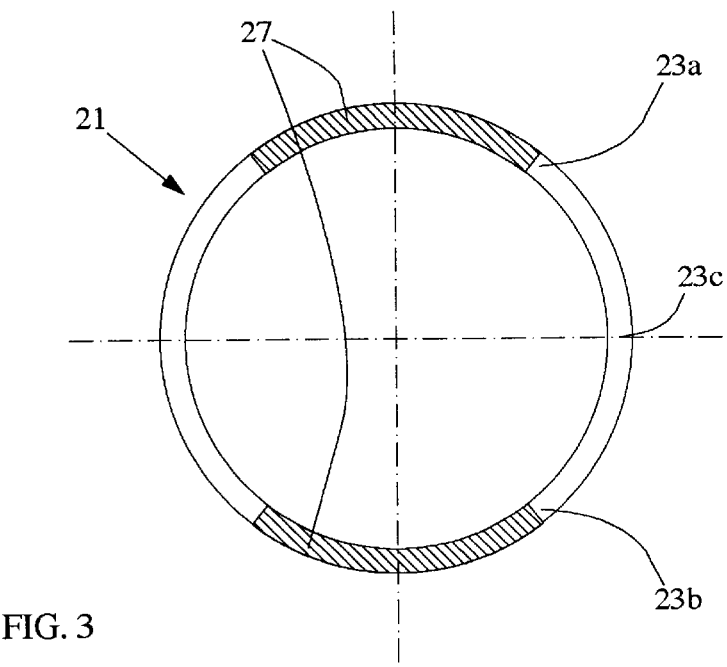
FIG. 3 is a sectional view of the structure pipe of FIG. 2, taking along a plane indicated by the numerals IIII—IIII of FIG. 2.

For a structure pipe 21 having an inner diameter in the 4 to 12 inch range, the wall thickness is from 0.4 to 0.8 inch, and the width of each slot is from 0.080 to 0.160 inch. A centerpoint 23c is equidistant to the ends 23a, 23b and is located on a row helix 25. Helix 25 is at the same helix angle or pitch for both rows of slots 23. The length of each of the slots 23 is preferably the same within a central portion of support tube 21, and preferably the length of slots 23 in one row is the same as the slots 23 in the other row. As shown in FIG. 3, the centerpoints 23c are 180 degrees apart from each other when two rows of slots 23 are employed.

The two rows of slots 23 define two bands 27 between them which are solid and free of slots 23. Bands 27 are also located on helixes 29, which are parallel to the helixes 25 for the rows of slots 23. Helix 29 is within a range of 10 to 30 degrees relative to axis 30. The width of each band 27 is uniform and constant throughout the central portion of support tube 21. The widths of bands 27 are not necessarily the widths of the rows of slots 23, however. In the preferred embodiment, the sum of the widths of bands 27 will cover 25 to 45 percent of the circumference, with the widths of the slots 23 covering the remaining circumference.

Slots 23 are parallel to each other and inclined relative to axis 30 of wall 21 on a helix angle that is other than 90 degrees, and preferably 65 to 85 degrees. An arc member 33 is defined between each slot 23, joining the bands 27. Each arc member 33 is substantially located on a helix 31 which inclines opposite to the helixes 25, 29 and at a much higher helical angle, or smaller pitch. Each arc member 33 is substantially perpendicular to helix 29 at the point of intersection. The helix angle for helixes 31 is preferably 65 to 85 degrees relative to axis 30.

Slots 23 provide flexibility, allowing pipe 11 to bend for transportation and installation far beyond metallic material limitations. The arc members 33 are free to flex in the plane of the pipe wall allowing shear motion of the tension bands 27 which in turn lowers greatly the moment required to bend the pipe 11. Tension bands 27 linked by arc members 33 provide the tension capability of structure pipe 21 when no internal pressure is present. Bending of the arc members 33 in a plane perpendicular to the pipe 11 keeps the tension bands 27 apart from each other, preventing collapse of the pipe under tension without internal pressure. To achieve high tension capability without pressure, a minimum ratio must be maintained between the wall thickness of structure pipe 21 and the lengths of arc members 33. The lengths of arc members 33 can be reduced and consequently the wall thickness by increasing the number of bands 27 to more than the two shown. Hoop strength is provided by the small pitch helical arc members 33 linking the sides of the two bands 27. The continuous helixes 31 of the arc members 33 balance torsion as these helixes are opposite in direction to the helixes 25, 29.

When manufacturing pipe 11, the outer diameter (OD in FIG. 4) of corrugated tube 13 is sized slightly smaller than the inner diameter of structure pipe 21. This difference provide the necessary clearance to slide the corrugated tube 13 into the structure pipe 21. The diametrical clearance is preferably about one percent of the inner diameter of structure pipe 21. For example, for an inner diameter of structure pipe 21 of 4 inches, the clearance on a diameter is approximately 0.040 inch.

Figure 5:
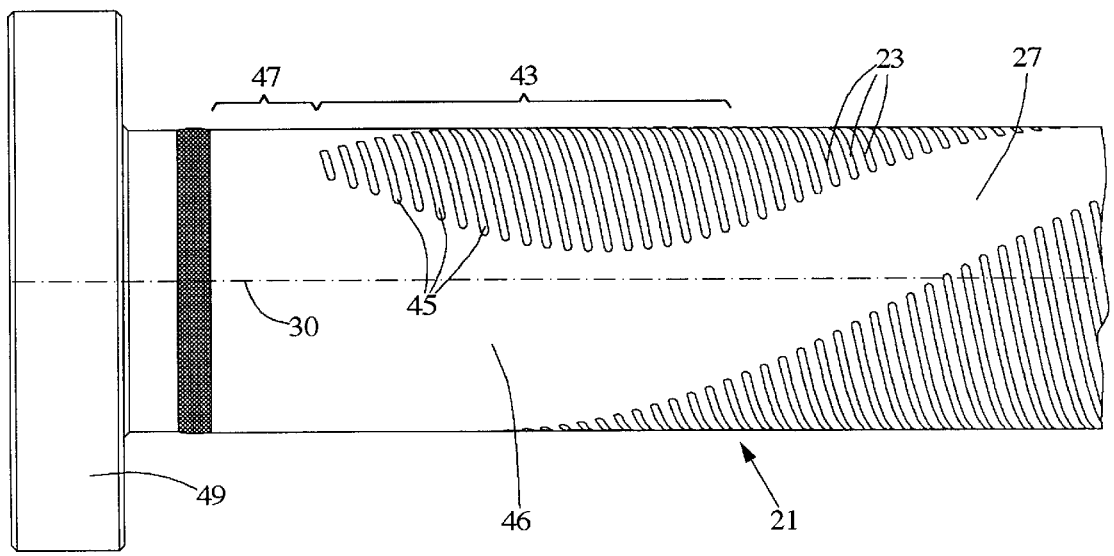
FIG. 5 is a side view of the structure pipe with an end fitting of the flexible pipe of FIG. 1.

A more complete assembly for flexible pipe 11 is shown in FIGS. 5 and 6. A conventional outer protection layer 35 will be placed over the structure pipe 21. The structure pipe 21 has a transition zone 43 joining each central portion near each end of support tube 21. In transition zone 43, slots 45 gradually decrease in circumferential length, while slots 23 in the central portion of support tube 21 between the transition zones 43 are of the same length. This results in increased width bands 46 within transition zone 43. Transition zone 43 joins a rigid pipe section 47 which has no slots. Rigid section 47 is a final end portion which joins a connecting flange 49, and which couples to rigid subsea production equipment 50 (FIG. 6).

In FIG. 6, details of structure pipe 21 are not clearly shown. However, both ends will have a transition zone 43 and a rigid pipe section 47. A connector 53 is located on the opposite end from flange 49 for connecting to a rigid pipe 55. In FIG. 6, a flexible pipe jumper 11 is used to connect rigid pipe 55 to rigid production equipment 50.

After assembling the corrugated tube 13 inside the structure pipe 21, an acceptance test pressure will be applied to the flexible pipe 11 and will be sufficient to plastically and permanently deform the corrugated tube 13 radially outward into contact with the inner diameter of structure pipe 21. The material and dimensions of corrugated tube 13 are selected to exceed yield and undergo permanent deformation as corrugated tube 13 expands radially into contact with structural pipe 21. Structure pipe 21 will not undergo any plastic expansion in diameter while test pressure is applied. After the test pressure is bled-off, the zero clearance between the outer diameter of corrugated tube 13 with the inner diameter of structure pipe 21 provides adequate strength for corrugated tube 13 to resist normal pressures expected to be encountered during use.

During installation, when undergoing curvature, the axial dimension or widths of the slots 23 will change. On the outer portion of the bend, the widths of slots 23 will increase, while on the inner part of the bend, the widths of slots 23 may close entirely at its center 23c, with arc members 33 touching each other. This will occur only at the minimum radius of curvature of flexible pipe 11 and will create minimum localized plastic deformation As long as the radius of curvature is above 6.5 times the diameter of flexible pipe 11 and corrugated tube 13 will bend within acceptable plastic deformation. This is acceptable because only one or possibly two bending to minimum radius and straightening cycles are applied during the lifetime of the flexible pipe 11.

The invention has significant improvements. The structure pipe is of a single piece and replaces a carcass and armors having several lengths of components. The monolithic structure pipe is less expensive to manufacture than numerous parts prior art types, yet provides pressure, tension and compression capabilities. The metallic corrugated tube permits substantial short radius of curvature during installation yet is able to withstand high temperature and high pressure during service life.

While the invention has been shown in only two of its forms, it should be apparent to those skilled in the art that it is not so limited, but is susceptible to various changes without departing from the scope of the invention.

I claim:

1. A flexible pipe comprising in combination:
   a fluid impervious pressure containing tube; and
   a cylindrical structure pipe surrounding the tube and having an axis, the structure pipe having at least two rows of elongated slots, each of the slots extending circumferentially about the axis less than 180 degrees and having two ends which define side margins to each of the rows of slots, the structure die having at least two bands located between the two rows of slots extending along the length of the structure pipe which are free of slots to provide tensile strength.

2. The flexible pipe according to claim 1 wherein each of the rows of slots has a centerline located equidistant between the side margins of each of the rows of slots which intersects the slots and extends helically along the structure pipe.

3. The flexible pipe according to claim 1 wherein the structure pipe has a transition zone near at least one end of the structure pipe in which the lengths of the slots gradually decrease toward said end.

4. The flexible pipe according to claim 1 wherein: the rows and the bands extend along helical lines which incline at an angle relative to the axis which is the same; and the slots of one of the rows have arc members spaced between them which are substantially along helical lines which incline in an opposite direction to and at a substantially larger angle relative to the axis than the rows of slots and the bands.

5. The flexible pipe according to claim 1 wherein the tube comprises a cylindrical metal conduit having corrugated undulations to enhance flexibility.

6. A flexible pipe comprising in combination:

a fluid impervious pressure containing tube;

a cylindrical monolithic structure pipe surrounding the tube and having an axis;

at least two rows of elongated slots extending along the length of the structure pipe and evenly spaced apart from each other to define arc members between each of the slots, each of the slots having a length determined by two ends which are circumferentially apart from each other, the arc members being parallel to each other and oriented relative to the axis on an arc member helix, each of the slots having a centerpoint equidistant between its ends, the centerpoints within the same row being located on a row helix which is transverse to the lengths of the slot, the row helix of each of the rows being at a row helix angle which is the same as the other rows; and at least two bands extending along the structure pipe which are free of slots, each of the bands being between two of the rows of slots, joining the arc members, and having a centerline which is on a band helix which is at a band helix angle that is the same as the row helix angle.

7. The flexible pipe according to claim 6 wherein at least a central portion of the slots within each of the rows has the same length as the slots within the other of the rows.

8. The flexible pipe according to claim 6 wherein at least a central portion of the slots within each of the rows has the same length as the slots within the other of the rows; and wherein the structure pipe has a transition zone joining the central portion near at least one end of the structure pipe in which the lengths of the slots gradually decrease toward said end.

9. The flexible pipe according to claim 6 wherein the arc member helix is at a much larger helix angle than the row helix angle and the band helix angle and inclines in an opposite direction.

10. The flexible pipe according to claim 6 wherein the tube comprises a cylindrical metal conduit having corrugated undulations to enhance flexibility.

11. A flexible pipe comprising in combination:

a fluid impervious pressure containing tube;

a cylindrical monolithic structure pipe surrounding the tube and having an axis;

at least two rows of elongated slots extending along the length of the structure pipe and evenly spaced apart from each other, each of the slots having a length determined by two ends which are circumferentially apart from each other relative to the axis, the slots being parallel to each other and oriented relative to the axis on a slot helix, each of the slots having a centerpoint equidistant between its ends, the centerpoints within the same row being located on a row helix which is transverse to the lengths of the slot, the row helix of each of the rows being at a row helix angle which is the same as the other rows;

at least two bands extending along the structure pipe which are free of slots, each of the bands being between two of the rows of slots and having a centerline which is on a band helix which is at a band helix angle that is the same as the row helix angle; and wherein the rows and the bands have dimensions selected to provide bending flexibility to the structure pipe.

* * * * *